United States Patent
Ben-David et al.

(10) Patent No.: US 11,930,985 B2
(45) Date of Patent: Mar. 19, 2024

(54) APPARATUS AND METHOD FOR WASHING AND SANITIZING COOKWARE BY ROBOTIC OR MANUAL OPERATION

(71) Applicant: Kitchen Robotics Ltd, Modiin (IL)

(72) Inventors: David Ben-David, Rehovot (IL); Yair Gordin, Modiin (IL)

(*) Notice: Subject to any disclaimer, the term of this patent is extended or adjusted under 35 U.S.C. 154(b) by 931 days.

(21) Appl. No.: 16/917,936

(22) Filed: Jul. 1, 2020

(65) Prior Publication Data

US 2022/0000330 A1    Jan. 6, 2022

(51) Int. Cl.
*A47L 15/00* (2006.01)
*A47L 15/42* (2006.01)
*A47L 15/46* (2006.01)
*G05B 13/02* (2006.01)

(52) U.S. Cl.
CPC ............ *A47L 15/46* (2013.01); *A47L 15/0028* (2013.01); *A47L 15/0036* (2013.01); *A47L 15/0047* (2013.01); *A47L 15/0076* (2013.01); *A47L 15/0092* (2013.01); *A47L 15/4236* (2013.01); *A47L 15/4285* (2013.01); *G05B 13/024* (2013.01); *A47L 2501/06* (2013.01); *A47L 2501/16* (2013.01); *A47L 2501/20* (2013.01); *A47L 2501/30* (2013.01)

(58) Field of Classification Search
CPC ... B65B 55/10; A61L 2/04; A61L 2/16; A61L 2/18; A61L 2/183; A61L 2/186; A61L 2/24; A47L 15/0028; A47L 15/0047; A47L 15/0065; A47L 15/0068; A47L 15/0076; A47L 15/0086; A47L 15/0092; A47L 15/16; A47L 15/4236; A47L 15/4278; A47L 15/4285; A47L 15/46; A47L 15/485; E03C 1/04; E03C 1/0401; E03C 1/0404; B67D 1/07; B67D 2001/075; B08B 3/02; B08B 9/08; B08B 9/0804; B08B 9/0813; B08B 9/0821; B08B 9/0826; B08B 9/0848; B08B 9/0861; B08B 9/0865; B08B 9/093; B08B 9/20; B08B 9/40

See application file for complete search history.

(56) References Cited

U.S. PATENT DOCUMENTS

| | | | |
|---|---|---|---|
| 3,858,595 A | 1/1975 | Schultz et al. | |
| 4,537,749 A * | 8/1985 | Hick | A01N 59/00 422/302 |
| 9,386,902 B2 | 7/2016 | Alpert | |
| 2016/0009433 A1* | 1/2016 | Tanaka | B65B 55/10 422/292 |

* cited by examiner

*Primary Examiner* — David G Cormier
(74) *Attorney, Agent, or Firm* — Haim M. Factor; 1st-Tech-Ideas.com

(57) ABSTRACT

The present invention is an apparatus and a green and economical method for washing and sanitizing cookware including pots, pans and containers suitable for all types of cookware, wherein the washing and sanitization method is a two stage process involving utilization of cold water jet for washing of utensils and heating water for sanitization of the cookware without the use of detergents or chemicals.

9 Claims, 2 Drawing Sheets

APPARATUS AND METHOD FOR WASHING AND SANITIZING COOKWARE BY ROBOTIC OR MANUAL OPERATION

An apparatus and method for washing and sanitizing cookware by robotic or manual operation.

FIELD OF THE INVENTION

The present invention is an apparatus for a green and economical method for washing and sanitizing cookware including pots, pans and containers suitable for a variety of cooking. The said apparatus and method applies two stage washing and sanitization process involving utilization of cold water jet for washing of utensils and heating water for sanitization of the cookware without the use of detergents or chemicals. Further, the said apparatus has sufficient flexibility in being operable manually as well as incorporated in automatic cooking systems.

BACKGROUND OF THE INVENTION

Kitchen utensils are commonly washed manually, using the 3-sink system. In such a system, chemicals and detergents are primarily used for cleaning and sanitizing in a strict and predefined procedure. However, the system suffers from the basic lacuna of being a time-consuming method. Further, in such a system, the washing cycle includes constant durations for each step, as well as constant amounts of detergent and water volumes with a limited range for defined water temperature. As a result, the process is considered inefficient resulting in energy waste, and negative environmental effect, as a result of using excessive amounts of water and detergents. Various inventions in this line are brought forth.

U.S. Pat. No. 9,386,902B2 titled, "Dishwasher and method" discusses a personal dishwasher washes and dries a dish that is manually or mechanically moved through a dishwasher chamber or is manually placed in and manually removed from the chamber. Pressurized water, possibly containing soap, wetting agent, etc., may be added to the wash water. Steam may be used to for cleaning and/or disinfecting. Ultraviolet light may be used for disinfecting. The dishwasher chamber may be enlarged to pass larger dishes, bowls, glassware, etc. for washing. A method of washing dishes, comprising inserting a dish manually into a dishwasher, passing the dish through the dishwasher, and withdrawing the dish. A method of washing a dish, comprising inserting a single dish into a dishwasher, directing fluid under pressure at the dish, directing air flow at the dish, and withdrawing the dish.

WO2016111648A1 titled, "Compact dishwasher" talks of a compact dishwasher comprises a carrier for carrying eating utensils; a fluid communication network for discharging washing fluid onto the eating utensils; and a fastener for holding the eating utensils exposed to the washing fluid. A method for washing eating utensils comprises a first step of providing an industrial dishwasher; a second step of fastening at least one of the eating utensils to a carrier of the industrial dishwasher; and a third step of discharging washing fluid onto the at least one of the eating utensils for cleaning the at least one of the eating utensils.

CN2284597Y titled, "Pressure spray semi-automatic dish and bowl washing machine" talks of a utility model relates to a pressure water spraying semi-automatic dish and bowl washing machine. The utility model comprises a dish and bowl conveying chain, a plurality of groups of hot water spraying pipes, cold water spraying pipes and clear water pressure water spraying pipes, an electric control cabinet, etc., and the groups of the water spraying pipes are distributed on upper layers and on lower layers. The utility model is characterized in that a machine frame is in the type that the upper part is separated from the lower part, an integral type water-receiving dish with a funnel type is arranged on the separate surface, the dish and bowl conveying chain is arranged between the upper water spraying pipes and the lower water spraying pipes, and the dish and bowl conveying chain is connected with a power source. The utility model is provided with an independent slag-flushing chamber, an independent hot water washing chamber, an independent cold water cleaning chamber and an independent running water cleaning chamber; each chamber is provided with a group of slag-flushing water spraying pipes, a group of hot water washing water spraying pipes, a group of cold water spraying pipes and a group of running water spraying pipes; each group of water spraying pipes is respectively pressurized by three water pumps to spray the water, and the water is supplied by the water tank of each group of water spraying pipes. The utility model has the advantages of small space occupation, low cost, safety and high washing efficiency; the washing, the rinsing and the cleaning can be continuously completed at one time.

U.S. Pat. No. 3,858,595A titled, "Utensil washing apparatus" discusses a machine for washing dishes as well as pots and pans includes a rack contacting sensor mechanism for determining whether a dish rack or a pots and pans rack is positioned within the machine. The sensor mechanism distinguishes between the sizes or types of the dish racks and pots and pans racks, and through an electrical circuit automatically adjusts the washer spray pressure depending upon the type of rack located in the machine.

While in some of the stated prior arts, detergent and water are used, in others, no usage of hot water for sanitizing is implemented. To take care of the above stated inefficient process, and to optimize the automizing cooking processes, considered as the launch-pad for modern cooking process, it requires an in-line approach for washing and sanitizing the utensils optimally through consecutive usage of cold and hot water jets without the use of detergent. Further, application of automatic mechanism entails optimization of the washing cycle enabling cost effective, environmentally friendly process.

SUMMARY OF THE INVENTION

An aspect of the present invention is to provide a washing and sanitizing apparatus for kitchen utensils, such as pots, pans and containers.

Another aspect of the present invention is to provide a washing and sanitization apparatus, suitable for all types of cookware, including induction compatible cookware.

In a still further aspect of the invention the apparatus can be operated as stand-alone or incorporated in-line with automated robotic systems, food processing lines, production lines, kitchens, manufacturing facilities or domestic use.

A still further aspect of the invention is to provide an apparatus that washes kitchen utensils (such as pots and pans) and sanitizes them, removing dirt, contaminants and bacteria.

A further aspect of the invention is a 2-stage process, washing and removing debris, dirt and residuals as a first stage and heat sanitizing a second stage. The cookware is moved through the 2-stage process automatically or manually.

A further aspect of the invention is a stage 1 washing process, using a sink, with a water nozzle mounted in the center. The nozzle is easily replaceable, manually or automatically, thus adjusting the water jet geometry to the cookware dimensions.

Another aspect of the invention is to perform the stage 1 washing cycle, while the cookware remains static. The cookware is positioned above the sink, while the inner surface, to be washed, is facing the sink and nozzle.

Another aspect of the invention is manual or automatic positioning of the cookware. The cookware might be positioned in place and moved between the process stages of 1 and 2, manually or by a motion element.

Another aspect of the invention is the use of cold-water jet, generating a high velocity of the water droplets for removing the debris, dirt and residuals from the cookware.

Another aspect of the invention is generating the water pressure and flow using a water pump which may be a centrifugal pump or a high-pressure piston pump and which may be powered by an electric motor or a petrol engine.

Another aspect of the invention is regulation of the water flow by an electrical valve, such as a solenoid or a plunger type actuator or a pivoted armature.

A further aspect of the invention is adjusting and controlling the water flow and pressure depending on the amount and type of dirt and debris to be removed, thus optimizing the water consumption and washing duration.

A still further aspect of the invention is heat sanitization of the cookware. Cookware sanitization is performed as a second stage of the process after the dirt and any residuals are removed by the washing cycle of stage 1.

Another aspect of the invention is engaging and disengaging the heating element. To fit the heating element to the inner volume of the cookware a relative motion is generated, between the cookware and the heating element. The relative motion can be generated by an electrical motor, pneumatic valve or a manual motion, positioning the heating element in a predefined position.

Another aspect of the invention is the ability to control the thickness of the water layer, by controlling the position of the heating element relative to the cookware.

A still further aspect of the invention is induction coil, or any other heat generating apparatus, powering the heating element of the apparatus. In case the heat is generated by an induction coil, positioned inside the heating element, the construction and materials of the heating element will comply accordingly.

A still further aspect of the invention is avoiding detergents and chemicals, thus saving cost and sustaining a green, environmentally clean process.

A still further aspect of the invention is invoking the water pump, the water regulator valve and the induction unit by the controller.

Another aspect of the invention is a vision system, analyzing the washing process and deriving the optimal parameters for performance sustainability and constant improvement. Water pressure, flow, heating temperature and durations can be adjusted to achieve acceptable performance and energy saving, minimizing water and power consumption.

Figure 1:
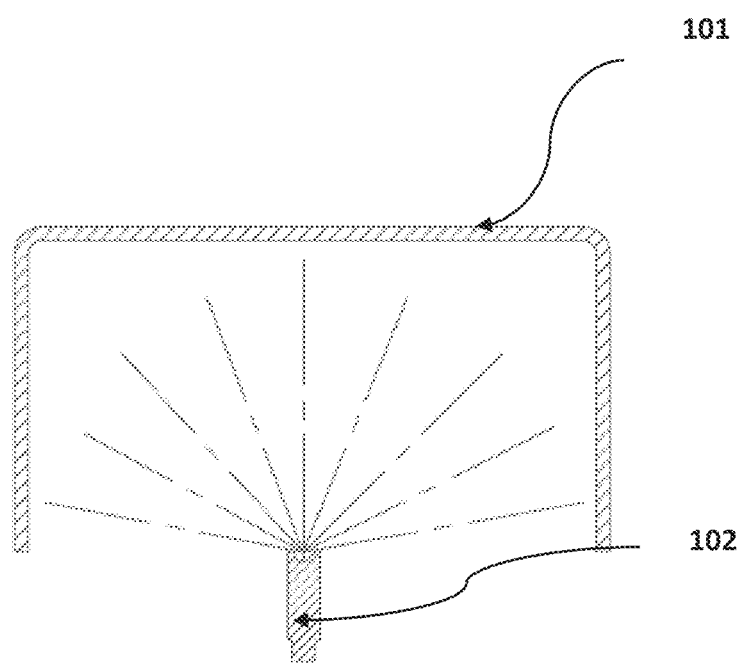
FIG. 1 is a section view of the stage 1 of the process—cold water wash, detaining the water dispensing replaceable nozzle, water and the cookware.

REFERENCE NUMERALS 101 cookware
102 replaceable water nozzle
201 heating element
202 water layer
203 cookware
204 heat generating component (such as an induction coil)

DETAILED DESCRIPTION OF THE INVENTION

The following disclosure describes several embodiments of washing and sanitizing apparatus for induction suitable cookware as well as the methods of washing and sanitizing thereof. Specific details of several embodiments of the present disclosure are described below with reference to FIGS. 1 and 2 to provide a thorough understanding of the embodiments. Other details describing well-known structures and systems often associated with washing cookware, however, are not set forth below to avoid unnecessarily obscuring the description of the various embodiments. Accordingly, those of ordinary skill in the art will understand that the invention may have other embodiments in addition to those described below. Such embodiments may include other elements and features in addition to those described below, or they may lack one or more of the features or elements described below.

Figure 2:
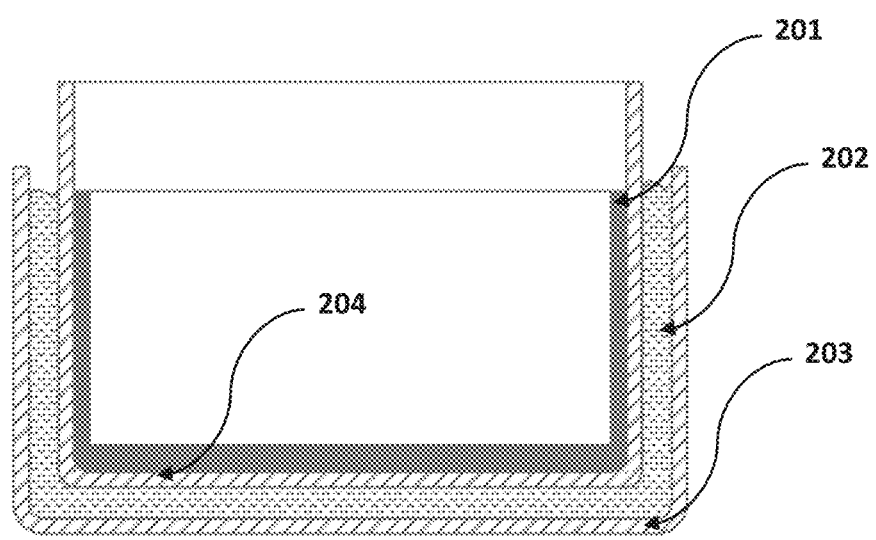
FIG. 2 is a section view of the stage 2 of the process—sanitizing, detaining the heating element, water layer and the heat generating component.

Referring to FIGS. 1 and 2, the apparatus of the present invention comprises of:
replaceable water nozzle 102;
heating element 201;
heat generating component 204;
sink (not shown);
pump (not shown);
controller (not shown);
electric valve (not shown); and
vision system (not shown).

In an embodiment of the present invention the apparatus comprises of a sink, with water nozzle 102 mounted in the center of the sink. The nozzle 102 is static and generates a spray of water or a water jet with a specific geometry, suitable for the cookware dimensions depending upon the height and diameter of the cookware. The nozzle 102 is easily replaceable, manually or automatically, thus adjusting the water jet in sync with the geometry of the cookware dimensions. During the washing operation of the cookware, the cookware 101 remains static and is positioned above the sink, while the inner surface, to be washed, faces the sink and the nozzle 102. The cookware 101 is positioned centrally above the nozzle 102, enabling an even distribution of the water spray pattern or a water jet generated by the nozzle 102.

In some embodiments a spiral nozzle or a cone nozzle may be used, generating a cone shape water pattern, covering the entire inner surface of the cookware.

The water pressure and flow required during the washing cycle is generated using a water pump. The pump may be a centrifugal pump or a high-pressure piston pump for generating the water pressure and the water flow required. The pump may be powered by an electric motor or petrol engine.

The pump performance may be regulated by a controller, adjusting the motor frequency thus controlling the pressure and flow values.

In the present invention, the water flow and pressure are adjusted and controlled depending on the amount and type of dirt and debris to be removed, thus optimizing the water consumption and washing duration. Further, the washing cycle parameters are evaluated and adjusted accordingly to each cookware being washed and depending upon the cookware content (recipe ingredients cooked) and cooking conditions, such as heating temperature and cooking duration.

In some embodiments the positioning of the cookware may be manual or automatic. The cookware might be positioned in place manually or moved in position by a motion element where the motion element might be a robotic arm, electrical motor or a pneumatic drive.

In some embodiments the water flow may be regulated by an electrical valve, such as a solenoid or a plunger type actuator or a pivoted armature.

In some embodiments the washing apparatus, may be used both as stand-alone and also can be incorporated in automated or robotic systems.

Referring to FIG. 2 for heat sanitization of the cookware, the cookware 203 is filled with water using the water pump or any water dispensing component. The heating element 201 is placed inside the cookware 203 containing water 202 and the water is heated with the help of the heating element 201 which is powered by the heat generating component 204.

The engaging and disengaging of the heating element 201 within the inner volume of the cookware 203, is undertaken by generating a relative motion by an electrical motor, pneumatic valve or a manual motion, which positions the heating element 201 in a predefined position inside the cookware 203.

The apparatus of the present invention operates to wash and sanitize the cookware in a two-stage operation wherein the cookware is moved through the 2-stage process automatically or manually, the operation comprising the steps of:
  Stage 1: Washing the utensils and
  Stage 2: Heat sanitizing the utensils
  Stage 1: Washing the Utensils The step of washing utensils comprises of placing the inverted cookware i.e. the surface of the cookware on which the food is cooked, over the nozzle of the sink and a cold-water jet is sprayed towards the surface of the inverted vessel. The cold-water jet generates a high velocity of water droplets, which gain momentum, generating force on impact with the dirty surface of the cookware. The impact force removes dirt particles from the cookware surface. The droplets velocity depends on the water flow rate and pressure. The flow rates might be between 10 l/min and 40 l/min. The pressure might be between 3 bars and 100 bars.

Stage 2: Heat Sanitization of the Washed Utensils

The cookware sanitization is performed as a second stage of the process after the dirt and any residuals are removed by the washing cycle in stage 1. The cookware is filled up with a predefined and controlled amount of water, using a water pump or water dispensing component. The sanitization is achieved by heating a water layer, between the cookware food contact surface and a heating element. The heating element is designed to fit the inner volume of the cookware, leaving a gap of 2 to 10 mm. When the heating element is inserted into a cookware containing water, the water is distributed within the remaining gap, creating a uniform layer between the cookware food contact surface and the heating element. The heating element generates heat, raising the temperature of the water layer to 170 F. to 200 F., thus sanitizing the cookware within 5 to 60 seconds.

Further, the heating element needs to be fitted properly within the inner volume of the cookware. The engaging and disengaging the heating element within the inner volume of the cookware is achieved by generating a relative motion between the cookware and the heating element. The relative motion can be generated by an electrical motor, pneumatic valve or a manual motion, positioning the heating element in a predefined position.

The apparatus of the present invention can control the thickness of the water layer, by controlling the position of the heating element relative to the cookware. Referring to FIG. 2, the heating element is concentric to the cookware's inner diameter and movable along its axis. The heating element, once engaged with the cookware, occupies a major portion of the cookware's inner volume. This enables the water inside the cookware spread in the gap created between the heating element and the cookware, thereby creating an even layer. The engaging depth of the heating element might be controlled, manually or automatically, thus regulating the gap between the heating element and the cookware bottom flat surface, affecting the water layer thickness.

In some embodiments of the present invention, if the heat generating apparatus, powering the heating element is an induction coil positioned inside the heating element, the choice of materials for making the induction coil will be from ferrous and conductive metals such as steel. Since the induction element, made from such metals, generates a rapidly alternating magnetic field, generating currents inside the heating element, causing it to heat up.

The apparatus of the present invention enables sustain a green and environmentally clean process since the debris, organic matter and food remains from the cookware is washed and cleaned by the impact of water droplets without using any harmful chemicals which are present in the detergents. Also, the sanitization of the washed utensils is undertaken through the process of heating the cookware to high temperatures, thereby annihilating the bacteria and microorganisms left after washing of the utensils.

The controlled working of the apparatus of the present invention is achieved by the controller, which functions to invokes the water pump, the water regulator valve and the induction unit. The controller generates the washing cycle as well as the sanitizing cycle, adjusting the washing and sanitizing parameters, such as pressure, flow, heating temperature and durations.

In some embodiments the system may comprise of a vision system, which analyzes the washing process and derives optimal parameters for performance sustainability and constant improvement. This system helps to adjust the water pressure, flow, heating temperature and durations for achieving acceptable performance and energy saving thereby, minimizing water and power consumption.

In an embodiment of the present invention, an apparatus is provided which washes and sanitizes all types of cooking utensils including pots, pans and containers and which may or may not be induction compatible cookware.

In some embodiments the apparatus may be operated stand-alone or incorporated in-line with automated robotic systems, food processing lines, production lines, kitchens, manufacturing facilities or domestic use.

The present disclosed subject matter may be a system, a method, and/or a computer program product. The computer program product may include a computer readable storage medium (or media) having computer readable program instructions thereon for causing a processor to carry out aspects of the present disclosed subject matter. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter. Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The block diagrams in the Figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description, but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

The invention claimed is:

1. An apparatus for washing and sanitizing cookware comprising:
   a replaceable water nozzle;
   a sink;
   a heating element;
   a heat generating component;
   a pump;
   an electric motor;
   a controller; and
   wherein, the water nozzle is static and mounted at the center of the sink, the water nozzle configured to generate a spray of cold-water jet with a specific geometry,
   wherein, the cookware to be washed remains static and is positioned centrally above the nozzle and the sink,
   wherein, relative motion required for engaging and disengaging the heating element within an inner volume of the cookware is generated by the electric motor, configured to position the heating element in a predefined position.

2. The apparatus of claim 1, wherein the water nozzle is any one of a cone shaped nozzle and a spiral nozzle.

3. The apparatus of claim 1, wherein the pump is any one of centrifugal pump and a high-pressure piston pump.

4. The apparatus of claim 1, wherein the apparatus further comprises an electric valve for regulating a water flow from the spray nozzle.

5. The apparatus of claim 1, wherein an electric valve includes any one of a solenoid, a plunger type actuator, and a pivoted armature.

6. The apparatus of claim 1, wherein the cookware includes pots, pans and containers which are induction compatible.

7. The apparatus of claim 1, wherein the cookware includes pots, pans and containers which are not induction compatible.

8. The apparatus of claim 1, wherein the apparatus is operated as a stand-alone.

9. The apparatus of claim 1, wherein the apparatus is incorporated in-line with automated robotic systems, food processing lines, production lines, kitchens, and manufacturing facilities.

* * * * *